(12) United States Patent
Rancour et al.

(10) Patent No.: US 9,449,643 B1
(45) Date of Patent: Sep. 20, 2016

(54) DATA STORAGE COMPONENT TEST DECK

(71) Applicant: Seagate Technology LLC, Cupertino, CA (US)

(72) Inventors: Michael Louis Rancour, Minnetonka, MN (US); Brett Robert Herdendorf, Mound, MN (US); Ronald Eldon Anderson, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/695,310

(22) Filed: Apr. 24, 2015

(51) Int. Cl.
*G11B 7/00* (2006.01)
*G11B 20/18* (2006.01)

(52) U.S. Cl.
CPC .................................. *G11B 20/1816* (2013.01)

(58) Field of Classification Search
None
See application file for complete search history.

(56) References Cited

U.S. PATENT DOCUMENTS

| | | | | |
|---|---|---|---|---|
| 4,184,184 A * | 1/1980 | Hedin | ................ | G11B 23/0321 360/133 |
| 4,967,155 A * | 10/1990 | Magnuson | ......... | G01R 33/1207 324/212 |
| 5,850,569 A * | 12/1998 | Luif | ................... | G11B 15/6835 710/10 |
| 6,286,362 B1 * | 9/2001 | Coffman | ............... | G01M 3/202 73/40.7 |
| 6,531,867 B1 | 3/2003 | Greene et al. | | |
| 6,679,128 B2 | 1/2004 | Wanek et al. | | |
| 7,012,805 B2 * | 3/2006 | Shah | ...................... | G11B 33/08 248/634 |
| 8,169,750 B1 | 5/2012 | Guzik et al. | | |
| 8,218,256 B1 | 7/2012 | Lin et al. | | |
| 8,270,118 B1 | 9/2012 | Cheng et al. | | |
| 8,339,747 B1 | 12/2012 | Hales et al. | | |
| 8,432,631 B1 | 4/2013 | Lin et al. | | |
| 8,456,973 B1 * | 6/2013 | Wong | ................... | G11B 19/048 369/47.5 |
| 8,544,164 B1 | 10/2013 | Cheng et al. | | |
| 2005/0109131 A1 * | 5/2005 | Wanek | ................. | G11B 33/121 73/865.9 |
| 2008/0291567 A1 * | 11/2008 | Keshavan | ............ | G11B 5/4813 360/77.02 |
| 2009/0316546 A1 * | 12/2009 | McKean | ............ | G11B 20/1816 369/53.1 |
| 2010/0061207 A1 * | 3/2010 | Trantham | ............... | G11B 27/36 369/53.1 |
| 2012/0023370 A1 * | 1/2012 | Truebenbach | ....... | G11B 17/225 714/27 |

* cited by examiner

*Primary Examiner* — Peter Vincent Agustin
(74) *Attorney, Agent, or Firm* — Hall Estill Attorneys at Law

(57) ABSTRACT

A test deck may be employed as part of a data storage component testing system. A test deck can consist of at least a bottom cover mating to a top cover to define an enclosed testing region configured to house a data storage medium, transducing head, and head suspension. The top cover may have an access port occupied by a door providing access to the enclosed testing region.

20 Claims, 7 Drawing Sheets

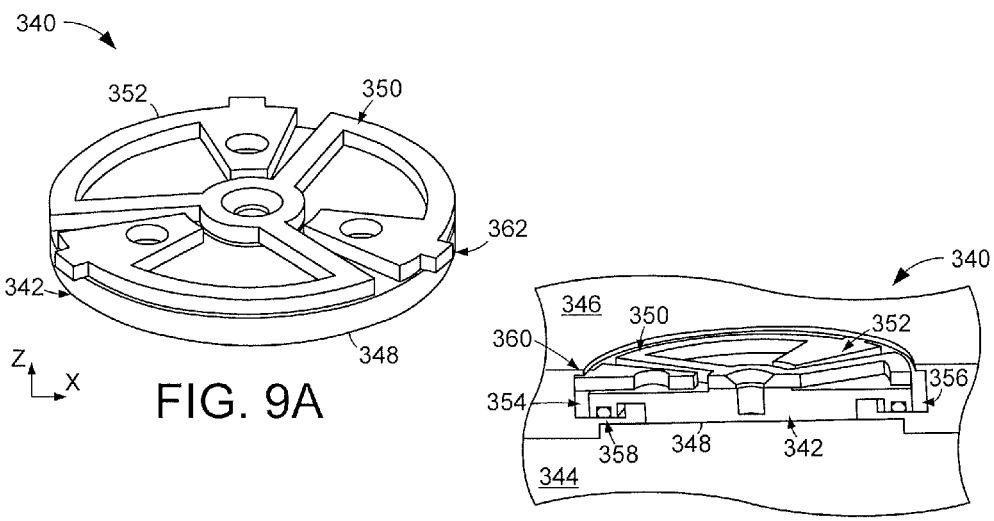
FIG. 9A
FIG. 9B
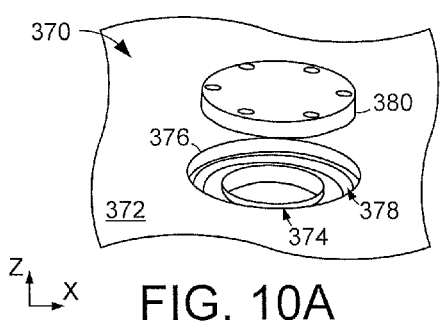
FIG. 10A
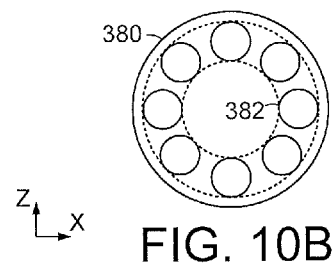
FIG. 10B
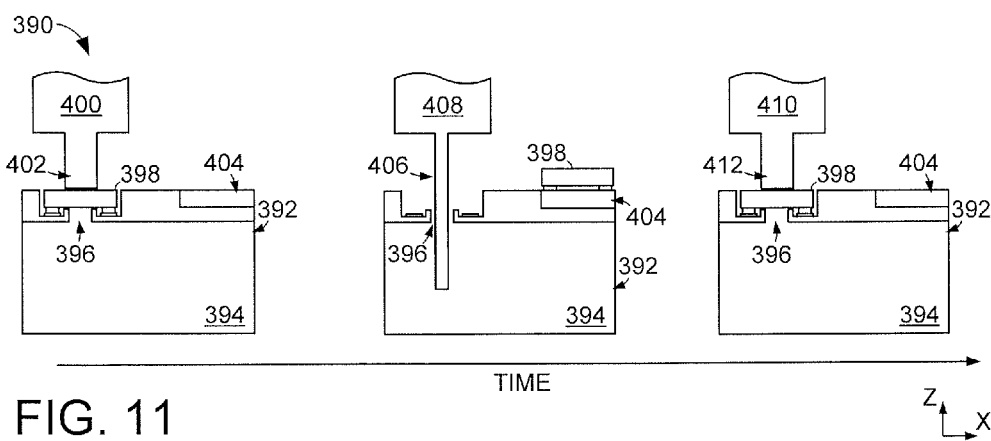
FIG. 11

DATA STORAGE COMPONENT TEST DECK

SUMMARY

A data storage component testing system, in accordance with various embodiments, has a test deck with at least a bottom cover mating to a top cover to define an enclosed testing region configured to house a data storage medium, transducing head, and head suspension. The top cover has an access port occupied by a door that provides access to the enclosed testing region.

BRIEF DESCRIPTION OF THE DRAWINGS

FIGS. 9A and 9B respectively are line representations of portions of an example data storage component test deck constructed and operated in accordance with some embodiments.

FIGS. 10A and 10B respectively show line representations of portions of an example data storage component test deck configured in accordance with various embodiments.

FIG. 11 illustrates a block representation of an example data component test deck arranged in accordance with some embodiments.

DETAILED DESCRIPTION

As data storage devices have advanced, data storage components have gotten physically smaller. Such reduced physical dimensions can be susceptible to design and process variations that jeopardize the accuracy and reliability of the data storage component. The increased potential for performance volatility has emphasized longer and more sophisticated testing procedures to qualify and certify a data storage component. However, inefficiencies in data storage component testing, such as non-testing loading and unloading times, can reduce the available testing time to maintain a minimum tested component throughput. Thus, industry has a continued goal of increasing the efficiency of a data storage component testing system, particularly to increase the amount of time available to conduct assorted tests with a data storage component.

Accordingly, a data storage component testing system can have at least one test deck configured with a bottom cover mating to a top cover to define an enclosed testing region that is configured to house a data storage medium, transducing head, and head suspension with the top cover having an access port occupied by a door to provide access to the enclosed testing region. By configuring the test deck as a housing that encloses the data storage components and has a form factor similar to a complete hard disk drive data storage device, a testing system can efficiently transfer multiple tested and untested test decks to and from multiple different testing slots. Also, the access port portion of the test deck allows for efficient access and exchange of tested and untested data storage components without having to disassemble the test deck. Also, the sealed small volume of the test deck allows for efficient use of alternative pressures and/or alternative gas in the testing environment, such as He at subatmospheric pressures.

Figure 1:
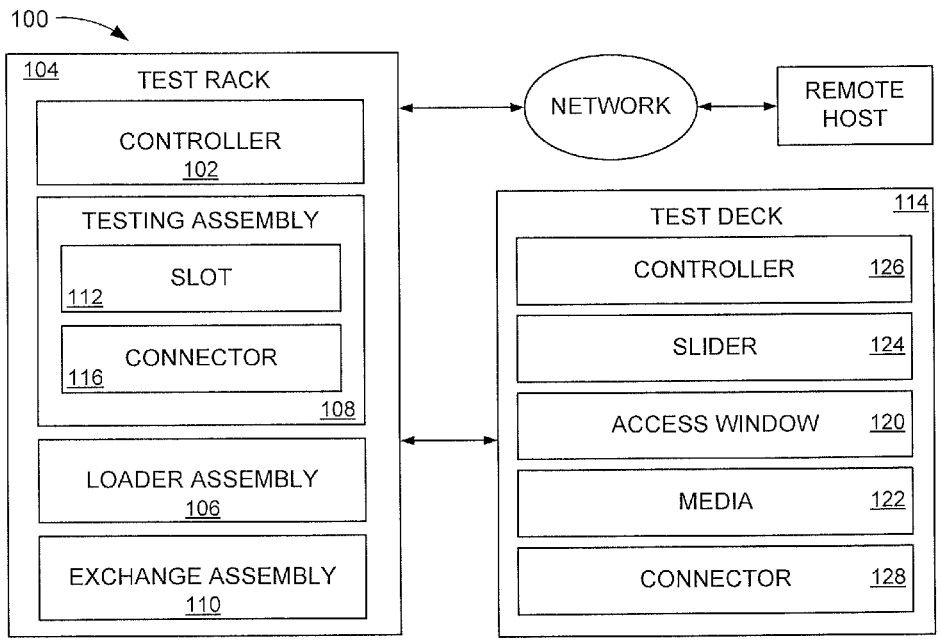
FIG. 1 is a block representation of an example testing system configured in accordance with various embodiments.

FIG. 1 is a block representation of an example data storage component testing system 100 that is configured and operated in accordance with some embodiments. The testing system 100 has at least one local controller 102 that is mounted in a rack 104 along with loader 106, testing 108, and exchange 110 assemblies. The testing assembly 108 has a plurality of test slots 112 that can be arranged vertically and horizontally to efficiently occupy physical space. The various testing slots 112 can have similar or dissimilar sizes and testing capabilities to allow the local controller 102 to simultaneously provide different testing environments for test data storage device components corresponding with different device form factors, such as 2.5" and 3.5" disk drives.

The loader assembly 106 can have one or more robotic or manual rails, conveyors, end effectors, and elevators that allow individual test decks 114 to be installed and subsequently removed from the respective test slots 112. It is contemplated that the loader assembly 106 can manipulate the position, pitch, and roll of a test deck 114 to allow complete electrical connection of a test slot connector 116 with a test deck connector 118. The ability to simultaneously engage and disengage multiple different test decks 114 with various test slots 112 in the rack 104 allows for efficient testing of large numbers of data storage device components.

The exchange assembly 110 can be configured with any number of manual or robotic means to engage and open an access port 120 portion of a test deck 114 before replacing one or more components housed within the test deck 114. For example, the exchange assembly 110 can remove and replace a data storage medium 122 and/or a slider assembly 124 that has a head gimbal assembly (HGA) in the test deck via the access port 120, which saves testing time and increases testing accuracy over systems that disassemble some, or all, of a testing assembly to interchange data storage device components. That is, the ability to exchange a single data storage device component via the access port 120 provides modular interchangeability that optimizes the efficiency and accuracy of the testing system 100.

Various embodiments configure each test deck 114 with a deck controller 126 that can store at least one testing pattern and/or routine that can be carried out by the test slot 112 to evaluate the quality and accuracy of at least the slider 124 and medium 122. Configuring each test deck 114 with a controller 126 allows the rack controller 104 to more efficiently conduct simultaneous testing of multiple different test decks 114 compared to the rack controller 104 directing different test patterns and routines for various test decks 114. That is, the individual test decks 114 can operate in conjunction with the rack controller 102 to allow different test decks 114 to execute different testing conditions, such as test slot 112 temperature, vibration, data writing conditions, reading conditions, transducer fly height, test deck internal-gas composition, and test deck internal gas pressure.

It is noted that the test deck 114 is not a functioning data storage device that can be utilized in a hard drive. In accordance with some embodiments, one or more of the slider 124 and medium 122 data storage components are conditioned for testing the quality and accuracy of other data storage components. For example, the data storage medium 122 can be configured with testing parameters, such as data tracks, data density, and data patterns, which are not conducive to hard drive data storage device media that are ready for the input of consumer data. Moreover, each test deck 114 is arranged with a single data medium 122 and slider 124, which would not logically be provided in a consumer-ready data storage device. Hence, although the test deck 114 is enclosed within top and bottom covers that define a sealed or unsealed internal environment like a hard disk drive, the test deck 114 are configured specifically to test one or more data storage components without the ability to store end-user data like a commercial hard disk drive.

Figure 2:
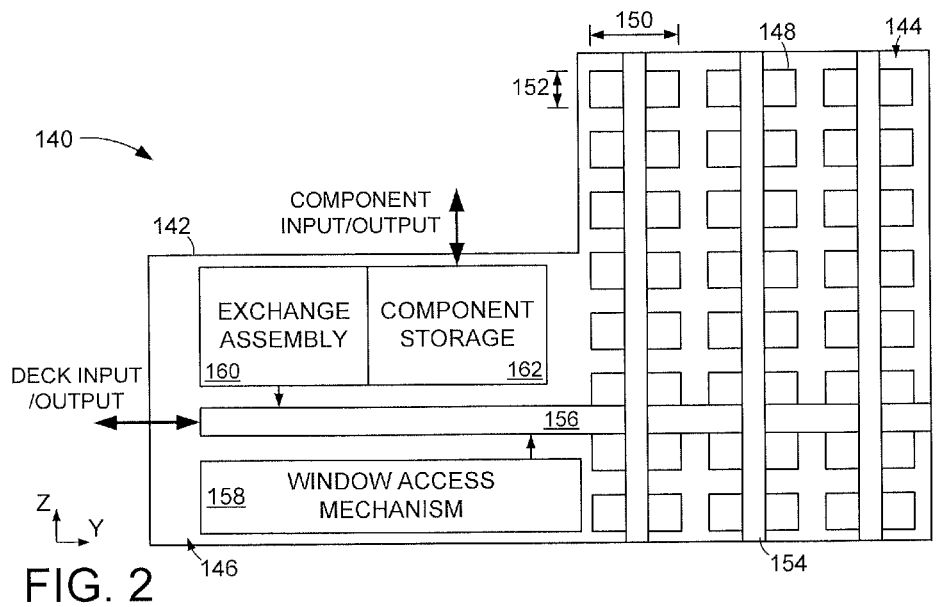
FIG. 2 shows a block representation of a testing system arranged in accordance with some embodiments.

FIG. 2 displays a line representation of an example testing system 140 configured in accordance with various embodiments to test at least one data storage data storage component. The testing system 140 is modular in the ability to test and replace individual data storage components, like the slider 124 of FIG. 1, without disassembling the entire test deck. The testing system 140 is housed within one or more rigid testing racks 142 that are arranged to provide at least a testing region 144 and an exchange region 146. The testing region 142 can have a plurality of test slots 148 that are arranged in the rack 142 to maximize testing capacity while providing efficient temperature management through natural and artificial airflow.

The test slots 148 of the test region 144 can be similar or dissimilar in structure and operation. That is, test slots 148 can have matching, or different, widths 150 and heights 152 as well as matching, or different, testing components to allow a diverse variety of testing environments for a test deck. For example, a first test slot 148 may have a larger width 150 and/or height 152 than a second test slot 148 in the test region 144 and the first test slot may have components allowing for heating and cooling a test deck while the second test slot may be configured only for cooling a test deck. The ability to configure the various test slots 148 with similar or dissimilar sizes and capabilities allows the testing system 140 to concurrently test under a wide range of different conditions, such as temperature and vibration.

The assorted test slots 148 are accessed by a loader assembly that comprises one or more locating means 154, such as, but not limited to, belts, conveyors, end effectors, paths, and tracks. In some embodiments, multiple independent locating means 154 communicate with an exchange mechanism 156 to allow a plurality of different test decks to be transported to and from the various test slots 148 simultaneously. The ability to concurrently have multiple different test decks being moved and tested maximizes the efficiency of the testing system 140 and allows the test slots 148 to conduct different testing routines that take different test times without hampering overall testing efficiency.

The exchange mechanism 156 is configured to position a test deck so that a port access mechanism 158 can efficiently open one or more port portions of the test deck. For example, the exchange mechanism 156 can orient each test deck so that access ports in the top and/or bottom covers of the test deck are each facing portions of the port access mechanism 158 to allow doors occupying the respective access ports to be removed and/or installed by the port access mechanism 158. The interaction of the test deck with the port access mechanism 158 prepares the test deck to be swapped by the exchange assembly 160. In other words, the port access mechanism 158 provides ingress into the enclosed testing region of the test deck to allow the exchange assembly to remove and replace less than all the data storage components of the test deck.

As shown, the exchange assembly 160 can be fed individual data storage components to be tested by a storage region 162. With a plurality of test decks being tested and engaging the exchange assembly 160, the storage region 162 can be configured to organize and correlate the input and output of individual data storage components. For instance, the storage region 162 can correlate the input of an untested slider component with a specific test deck while designating a tested slider component as defective or certified and ready for output to data storage device manufacturing.

The capability to process individual data storage components allows the testing system 140 to not only test the function of a data storage component, but also optimize the performance of the data storage component. As a non-limiting example, the testing system 140 can install a single data storage component into multiple different test decks that respectively test different data access conditions, like temperature, and different computing combinations, such as HGA, slider, medium combinations, to discover the optimized data storage environment for that specific data storage component. As such, the testing system 140 goes beyond merely testing for defects and allows for the optimization of computing performance for a data storage component.

Figure 3A:
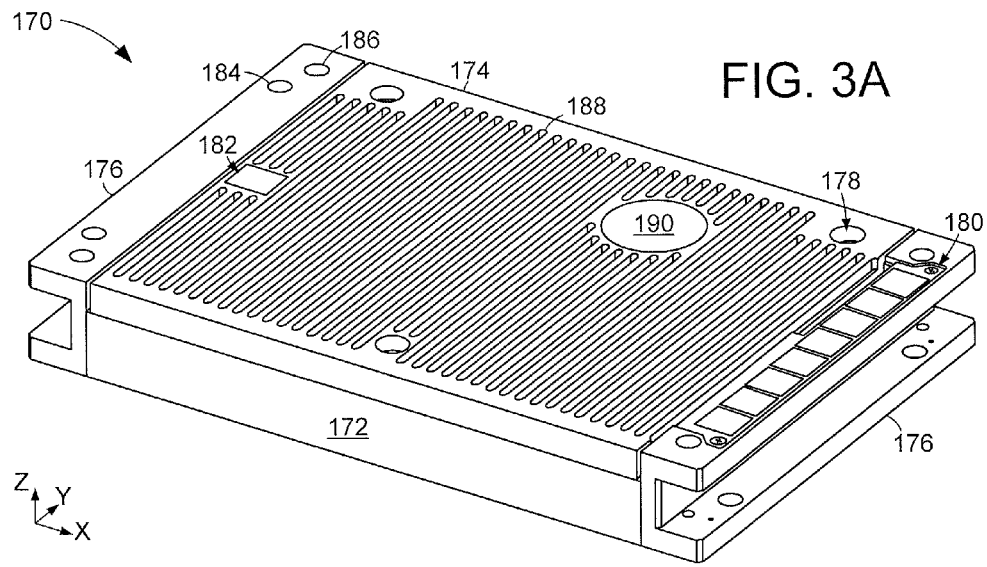
FIGS. 3A and 3B respectively are line representations of portions of an example data storage component test deck configured in accordance with various embodiments.
Figure 3B:
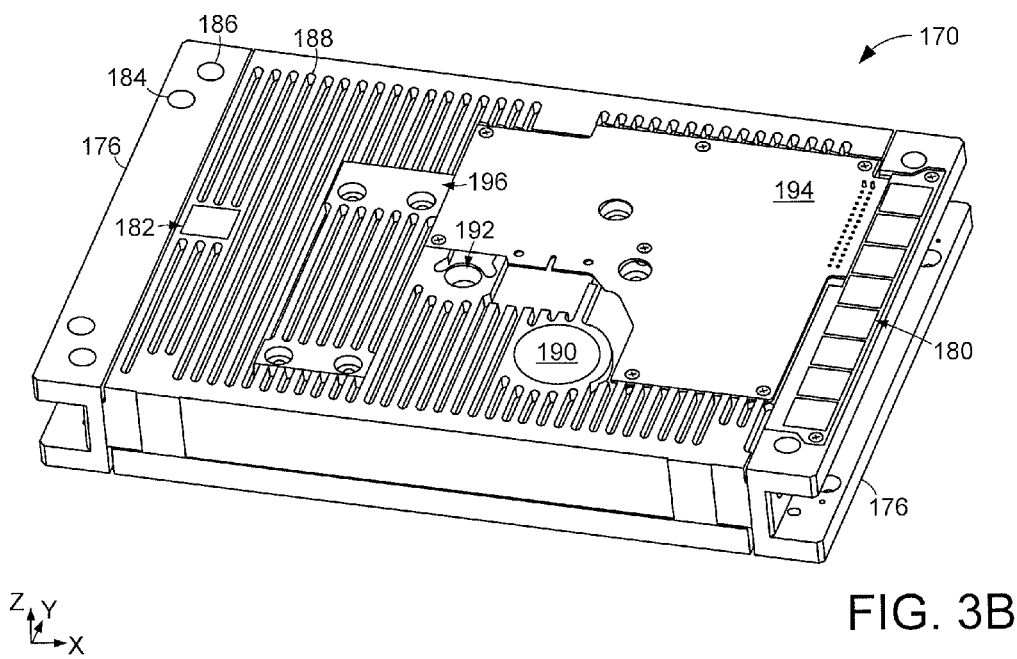

FIGS. 3A and 3B respectively depict line representations of an example test deck 170 that can be utilized in the testing systems 100 and 140 in accordance with various embodiments. The test deck 170 has bottom 172 and top 174 covers that are each disposed between rails 176. Although not required or limiting, the top 174 and bottom 172 covers can interconnect via one or more fasteners 178, such as a screw, latch, adhesive, rivet, magnet, and key, to enclose and define an internal testing environment. It is contemplated that the respective rails 176 can be continuously extensions of either cover 172 or 174 or can be individual components that are attached to the respective covers 172.

The rails 176 may each be constructed of a rigid material, such as plastic, metal, and ceramics, that is shaped to aid in securing the test deck 170 into a test slot. The rails 176 can be configured to house one or more electrical interconnectors 180, such as an interposer, that are separated from the deck covers 172 and 174 to provide an electrical pathway between the test deck 170 and a test slot. In some embodiments, the covers 172 and 174 are each constructed of machined or cast aluminum material that is plated, such as with a nickel plating, while the rails 176 are each constructed of 316 stainless steel to provide mass and durability to endure repeated ingress and egress from various test slots. The test deck 170 is configured with several different identification features that provide identification and alignment information to a testing system. As shown, a first identification feature 182 is a barcode that can be any digital and/or alpha-numeric representation of the test deck 170. It is noted that a barcode identification feature can be positioned on each deck cover 172 and 174 as well as the rails 176. Any number of partial or complete apertures 184 can serve as a second identification feature to allow engagement and alignment of the test deck 170 with portions of the loader, exchange, and testing assemblies of the testing system. The apertures 184 can be complemented by one or more guide posts that provide a third identification feature and a means for stacking and orienting adjacent test decks 170, such as by configuring the guide posts with a durable material, like 316 stainless steel, aluminum, or other non-metallic materials, to occupy the apertures 182.

The test deck 170 is configured, in some embodiments, with a plurality of feet 186 positioned along the outer boundary of the rails 176 to aid in engagement and transfer of the test deck 170 via belts and conveyors of a loader assembly. The respective feet 186 are constructed, in accordance with some embodiments, with the same material as a conveyor to promote friction and reduce test deck slippage while in transit to and from the various test slots. The feet 186 can be constructed so that heat generated by the test deck 170 and exposed to the test deck 170 by a test slot does not degrade the form and function of the respective feet 186. At least the top cover 174 can be constructed with one or more heat sink grooves 188 to handle heat generated by and exposed to the test deck 170.

The assorted heat sink grooves 188 can define the bounds of a top cover access port 190 and port door that can be selectively removed to provide access to the internal testing region of the test deck 170. It is contemplated that the port door can have one or more heat sink grooves or protrusions, but such configuration is not required. With the various materials and features of the test deck 170 that can be individually and collectively tuned, the overall weight of the test deck 170 can be maintained in a predetermined range, such as 1-2 kg.

In FIG. 3B, the bottom cover 172 is illustrated with a barcode identification feature 182, multiple feet 184, and heat sink grooves 188. The bottom cover 172 is also arranged with a spindle aperture 192 that provides access to a data storage medium rotating spindle that is controlled at least by a local controller resident on a printed circuit board assembly (PCBA) 194. The test deck 170 may have one or more PCBA 194 and can have any number of components, such as sensors, local memory, and control circuitry, which direct testing operations within the test deck. It is contemplated that the PCBA 194 resident in the bottom cover 172 can log test data along with biographical information about the data storage components in the test deck 170 that can be utilized by a separated testing system and/or test slot controller to determine the quality and performance of a data storage component housed in the test deck 170.

The bottom cover 172 has an access panel 196 that can be selectively removed via one or more fasteners to provide access to at least one testing component, such as a test deck heater, breather, or filter. It is noted that an electrical connector 180 is positioned on the bottom side of the rails 176. The bottom electrical connector 180 can be independent or redundant with respect to an electrical connector 180 positioned on an opposite top side of the test deck 170. The ability to have multiple electrical connectors 180 on different sides of the test deck 170 allows efficient installation and removal of the test deck 170 from a test slot by eliminating the need for the test deck 170 to be rotated by a loader assembly to orient a particular side in alignment with a test slot electrical connection.

Figure 4:
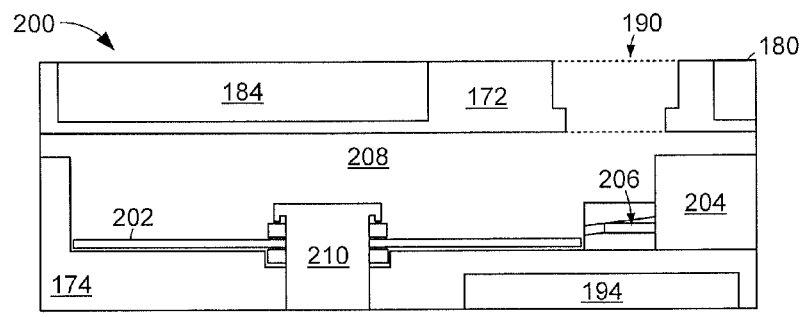
FIG. 4 illustrates a cross-section line representation of a portion of an example test deck arranged and operated in accordance with various embodiments.

FIG. 4 displays a cross-section line representation of a portion of an example test deck 200 constructed and operated as part of a testing system to certify performance of at least one data storage component. The cross-section view of the test deck 200 illustrates how the test deck 200 is dedicated to component testing and not end-user data storage by having reduced tolerances for a single data storage medium 202 positioned proximal a single actuator assembly 204 and slider 206 in the enclosed testing region 208. The various aspects of the enclosed testing region 208 are configured to allow data writing and reading operations to be conducted on a short-term scale.

Configuring mounting and alignment features to be temporary in nature can provide the short-term operability of the test deck 200. That is, the slider 206 can be mounted to the actuator assembly 204 to allow data access operations on the data storage medium 202 via rotation of the spindle motor 210 for efficient removal and replacement. For example, the slider 206 can be mounted to endure data access operations on the order of several minutes, but not for the lifespan of a data storage device, such as a commercial data storage hard disk drive. Also, the operating parameters, such as slider fly height and medium-to-cover separation distance, within the enclosed testing region 208, can be reduced to allow accurate testing results.

Figure 5A:
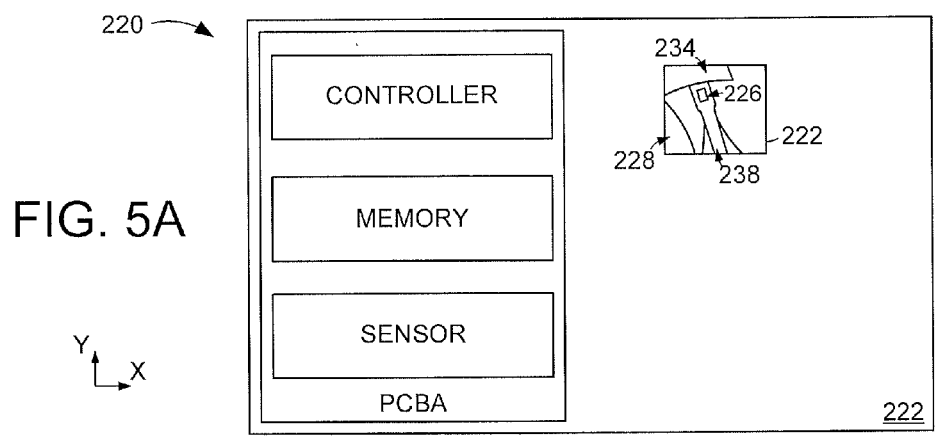
FIGS. 5A and 5B respectively are line representations of portions of an example test deck configured in accordance with some embodiments.
Figure 5B:
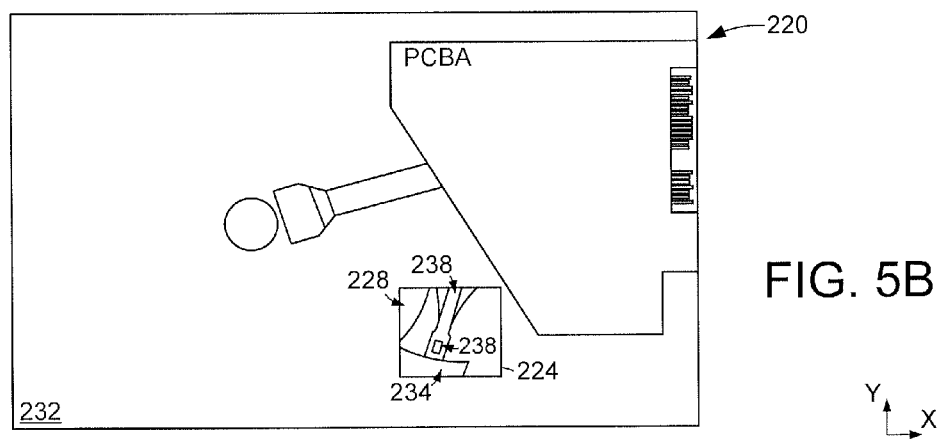

FIGS. 5A and 5B respectively show top and bottom view line representations of an example test deck 220 that has multiple access ports 222 and 224 to provide access to multiple slider assemblies 226 positioned to access opposite sides of a single data storage medium 228. Compared to the single slider assembly shown in FIG. 4 that is positioned proximal a single side of a data storage medium, configuring access ports 222 and 224 in the respective top 230 and bottom 232 covers of the test deck 220 allows multiple surfaces of the data storage medium 228 to be utilized for testing operations.

The respective access ports 222 and 224 can be similarly or dissimilarly configured. For instance, the ports 222 and 224 can be vertically aligned along the Z axis with matching shapes or can be vertically offset with different shapes and sizes. The ability to tune the size, shape, and position of the access ports 222 and 224 allows a port access mechanism of a testing system to concurrently or successively engage and replace the slider assemblies 226 without delaying movement of the test deck 220 to a test slot. To position the slider and actuator assemblies directly under the respective access ports 222 and 224, one or more alignment features can be utilized.

Figure 6:
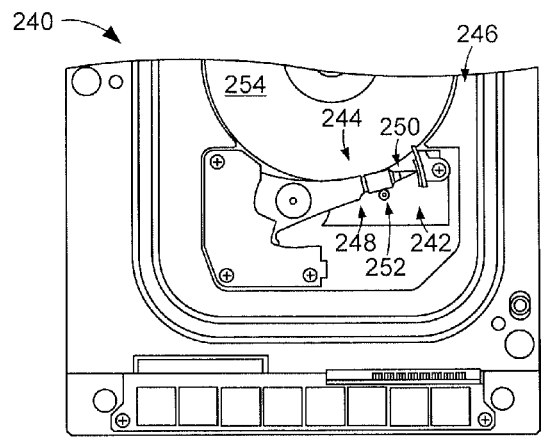
FIG. 6 shows a top view line representation of a portion of an example test deck configured in accordance with various embodiments.

FIG. 6 illustrates a top view line representation of a portion of an example test deck 240 configured with an alignment feature 242 to align a data access assembly 244 with an access port of a top cover, such as port 222 of FIG. 5A. The alignment feature 242 continuously extends within the enclosed testing region 246 to restrict movement of the actuator 248 portion of the data access assembly 244 beyond a predetermined point that positions a slider 250 portion of the data access assembly 244 beneath an access port.

In some embodiments, the alignment feature 242 consists of a hollow or solid post 252 that may, or may not, be padded with flexible material to prevent shock and vibrational trauma from incurring when the data access assembly 244 contacts the post 252. Although any number of posts 252 and other structures can be used to capture the data access assembly 244 at a predetermined location, the use of a single post contacting the actuator 248 and not the slider 250, as shown, allows the slider 250 to be engaged, removed, and installed without movement of the actuator 248. The position of the post 252 and data access assembly 244 when in contact with the post 252 can be tuned so that some, none, or all of the actuator 248 is over the data storage medium 254. That is, the alignment feature 242 can be tuned so that the data access assembly 244 can be interchanged via an access port without risking contact with the data storage medium 254.

Figure 7A:
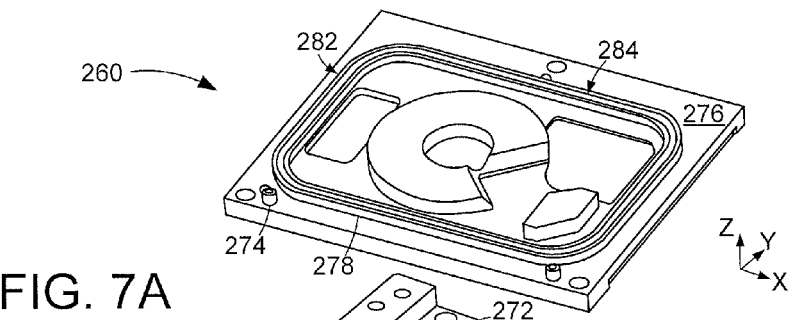
FIGS. 7A and 7B respectively depict line representations of portions of an example test deck arranged in accordance with some embodiments.
Figure 7B:
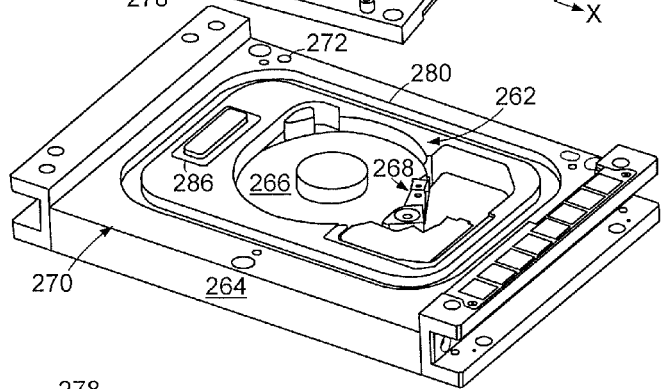
Figure 7B:
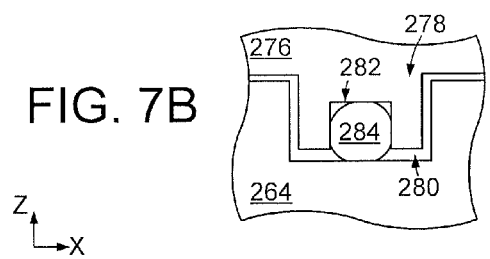

FIGS. 7A and 7B is an exploded view line representation of an example test deck 260 that shows how an enclosed testing region 262 can be sealed in accordance with some embodiments. The test deck 260 has a bottom cover 264 that is configured to define a bottom portion of the enclosed testing region 262 where a data storage medium 266 and data access assembly 268 are mounted. It is noted that the data access assembly 268 may consist of any number of components, but in various embodiments comprises a voice coil motor, actuator, and head gimbal assembly (HGA) that are each nested within a continuous cavity of the bottom cover 264 so that no part of the medium 266 or access assembly 268 rise above the top plane 270 of the bottom cover 264, along the X-Y plane.

The bottom cover 264 has a plurality of alignment apertures 272 configured to receive alignment pins 274 continuously extending from the top cover 276. The alignment apertures 272 and pins 274 can ensure a seal protrusion 278 of the top cover 276 is positioned in a seal recess 280 in the bottom cover 264. The seal protrusion 278 has a continuous groove 282 or notch in which a flexible gasket 284 is retained. The flexible gasket 284 can be removable and constructed of any type of material, such as foam, rubber, and cork, that protrudes from the groove 282 to engage the seal recess 280 and prevent fluid from entering or exiting the enclosed testing region 262, as illustrated in FIG. 7B.

The enclosed testing region 262 may be configured with at least one filter 286 that can equalize pressure in the testing region 262 and/or remove particulate contaminates. The top cover 276 has several protrusions that extend towards the data storage medium 266 to allow optimized airflow and vibration in during testing operations. It is contemplated that the data storage medium 266 is separated from the bottom 262 and/or top 276 covers by 0.005" or less, which can provide optimized data component testing that is not conducive to commercial data storage device operation. It is noted that the outside dimensions of the test deck 260 can be any size, but is 180 mm×120 mm×25 mm in some embodiments with a single data storage medium and at least one transducing head.

Figure 8A:
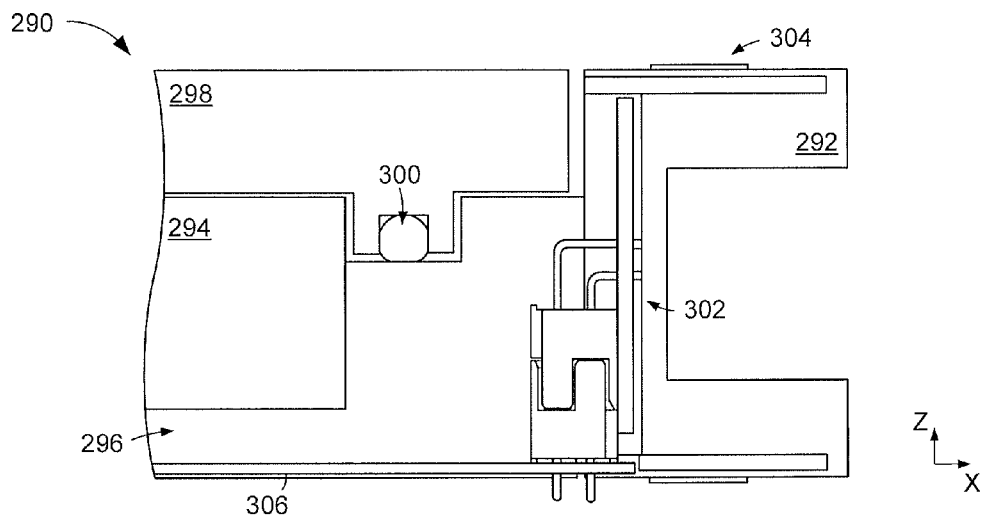
FIGS. 8A and 8B respectively display line representations of portions of an example test deck configured in accordance with various embodiments.
Figure 8B:
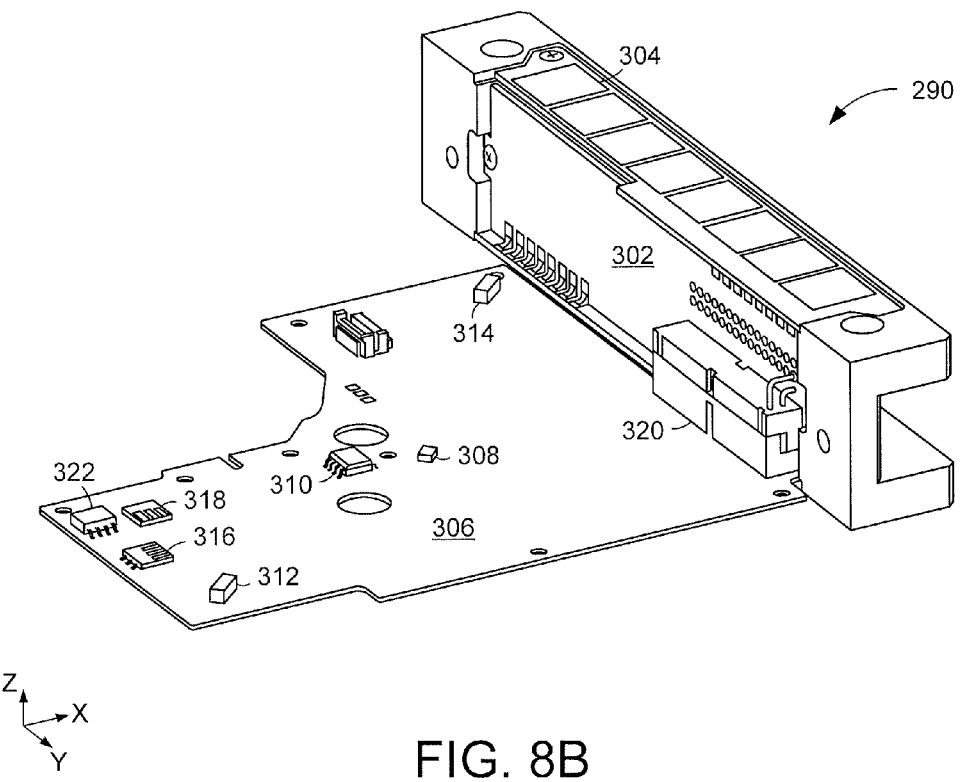

FIGS. 8A and 8B respectively are line representations of portions of an example test deck 290 that shows how a side rail 292 can be electrically interconnected with testing equipment in accordance with various embodiments. FIG. 8A displays a cross-section view of the enclosed testing region 294 that is sealed by the mating interaction of the bottom 296 and top 298 covers via a flexible gasket 300. The side rail 290 has a slot interface controller 302 that transitions electrical signals from at least one interposer 304 to a PCBA 306. The PCBA 306 can direct operation and testing of the testing components of the enclosed testing region 294, which include, but are not limited to, the data storage medium 308, actuator 310, and slider 312.

FIG. 8B depicts how the side rail 292 and PCBA 306 are incorporated together via at least one electrical connection, such as a solder joint or pinned bus. The PCBA 306 can have any number of data storage components that can execute and log a testing routine as well as environmental conditions that are either naturally occurring or artificially induced by a test slot. The PCBA data storage components can consist of at least a shock sensor 314, temperature sensor 316, rotation sensor 318, vibration sensor 320, servo connector 322, motor connector 324, heater connector 326, and slot interface connector 328. The combination of sensors and connectors can be tuned to allow at least one local controller 330 to conduct data storage component testing to determine the performance of one or more of the testing components housed in the enclosed testing region 294.

The various electrical components of the PCBA 306 can indicate when a testing routine is finished and when a testing component is due for exchange. In the event a testing component is to be interchanged, an access port is opened by an exchange assembly, such as assembly 160 of FIG. 2. FIGS. 9A and 9B respectively illustrate assorted line representations of an example access port 340 portion of a test deck. An access door 342 is configured to fit within the access port 340 and seal the enclosed testing region 344 from an exterior environment 346. The access door 342 has a solid plate 348 attached to a securement feature 350 that can be selected to engage, or disengage, the access port 340 at will.

Although not required or limiting, the securement feature 350 can be one or more flexible protrusions 352 that extend beyond the areal extent of the underlying plate 348 to contact a port recess 354, as shown in FIG. 9B. In accordance with some embodiments, the solid plate 348 is shaped to provide a keyed protrusion 356 that presents at least one sealing gasket 358 to contact the port recess 354. Sealing pressure can be applied on the sealing gasket 358 via a sealing ledge 360 portion of a cover. That is, articulation of the access door 342 and securement feature 350 with respect to the sealing ledge 360 can apply continuous downward pressure along the X axis to ensure sealing contact between the sealing gasket 358 and the port aperture 354.

It is contemplated that the securement feature 350 can be configured with any number of engagement members 362, such as apertures shown in FIG. 9A or protrusions, which can allow for the concurrent selection each flexible protrusion 352. For example, the engagement members 362 can be contacted by one or more tools to allow simultaneous movement of the solid plate 348 and flexible protrusions 352, such as be retracting the flexible protrusions 352 and rotating the access door 342 about the X axis. Therefore, the configuration of the flexible protrusions 352 and engagement members 362 can be tuned to provide a keyed means for securing the plate 348 within the port aperture 356.

In accordance with some embodiments, an access port can be closed with a magnetic latch. FIGS. 10A and 10B respectively illustrate line representations of portions of an example test deck 370. As shown in FIG. 10A, the test deck body 372 has an access port 374 that provides ingress and egress to an enclosed test region. The access port 374 is configured with a circumferential notch 376 in which a magnetic ring 378 is affixed. It is noted that the size, shape, and magnetic construction of the notch 376 is not limited to the arrangement shown in FIG. 10A and can be tuned to be any configuration. For example, magnetic material may be positioned in separate pads within the notch 376 instead of in a ring configuration.

FIG. 10B shows an access door 380 that is configured to fit within the notch 376 and attach to the magnetic ring 378 with a plurality of door magnets 382. The magnets 382 may be arranged as a single entity, such as the ring designated by segmented lines, or as at least two separate pads. The configuration of the magnets 382 and the magnetic ring 378 provides continuous attachment of the access door 380 with the test deck body 372 to close the access port 374 and test region. The magnetic attachment means of the door 380 and access port 374 may further provide self-centering for the access door 380 that allows for movement of the door 380 without opening the port 374. It is contemplated that depth of the notch 376, along the Z axis, is configured to allow the door to lie on or below the exterior boundary of the test deck body 372, which prevents inadvertent trauma to the access door 380.

FIG. 11 displays a line representation of a portion of an example data storage component testing system 390 arranged and operated in accordance with various embodiments. A test deck body 392 encloses a test region 394 that is accessed via a port 396 that is initially covered by a door 398 attached to the test deck body 392, such as with a magnetic latch like that shown in FIGS. 10A and 10B. After the test deck body 392 is moved into position relative to a first station 400, a first end effector 402 engages and removes the door 398 from the port 396. That is, the end effector 402 can supply enough force, or mechanical operation, to overcome the attachment means of the port 396.

Although it is contemplated that the first end effector 402 can retain control of the door 398 or place the door 398 in a storage area away from the test deck body 392, assorted embodiments position the removed door 398 in a piggyback region 404 on the outside of the test deck body 392. The piggyback region 404 can be recessed or protruding from the test deck body 392 and have securing features, such as magnets, screws, and hook-and-loop fasteners, which ensure the door remains connected to the test deck body 392 while a second end effector 406 at a second station 408 replaces at least one data storage component, such as a slider, in the test region 394.

With a data storage component replaced, the test deck body 392 can be moved back to the first station 400 or to a third station 410 to allow a third end effector 412, which may be the same as the first end effector 402, to remove the door 398 from the piggyback region 404 and close the port 396, as shown. The ability to utilize multiple stations and end effectors to access the test region, replace a data storage component, and prepare the test deck body 392 for subsequent testing increases efficiency compared to systems that use a single station with rotating end effectors. The use of the piggyback region 404 also increases efficiency versus systems that suspend or store the door 398 while a data storage component is exchanged.

Figure 12:
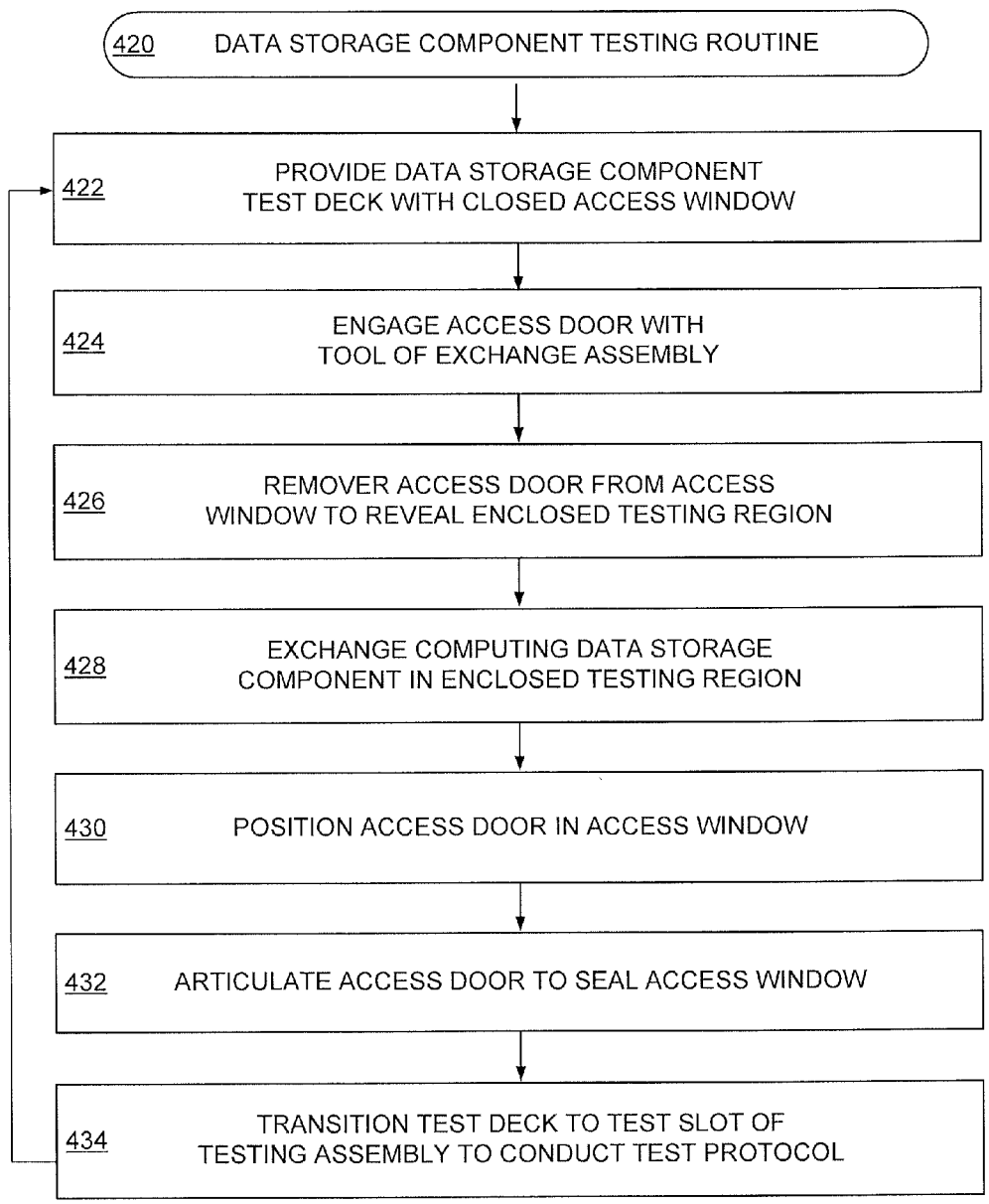
FIG. 12 provides an example data storage component testing routine that is carried out in accordance with various embodiments.

FIG. 12 provides an example data storage component testing routine 420 that can be carried out in accordance with various embodiments to test and certify the performance of at least one data storage component, such as an actuator, slider, transducing head, and data storage medium. Routine 420 begins with step 422 providing a data storage component test deck that has at least one access port closed by an access door. The test deck can be provided in step 422 as top and bottom covers that are disassembled or assembled. A tool portion of an exchange assembly engages one or more rigid or flexible engagement members in step 424. The physical engagement of the tool and access door in step 424 allows step 426 to actuate and remove the access door from the access port to reveal the underlying enclosed testing region.

The exchange assembly can subsequently interact with one or more portions of the enclosed testing region in step 428 to remove a first data storage component and replace it with a second data storage component. With the computing arrangement ready to be tested, step 430 proceeds to position the access door in the access port before step 432 articulates the access door to seal the access port. As illustrated in FIGS. 9B, 10A, and 11, but not required or limiting, step 432 can close and/or seal the access port. It is noted that the sealing of step 432 can be done pneumatically, hydraulically, and manually through friction, fasteners, and/or magnets.

Regardless of the manner in which the access door seals the access port, step 434 goes on to transition the test deck to a test slot of a testing assembly to conduct at least one data storage component test, which may involve the writing and reading of test data under a diverse variety of testing conditions.

While routine 420 can be conducted to replace and test at least one data storage component, the routine 420 is not limited to the aspects embodied in FIG. 12. For example, additional steps can concurrently or sequentially open a secondary access port and replace a different data storage component, as generally illustrated in FIGS. 5A and 5B. As such, routine 370 can be altered at will by adding, removing, and changing any data storage component testing step or decision.

It can be appreciated from the various data storage component test deck embodiments that having an enclosed testing region accessed via an access port allows for efficient removal of tested data storage components and installation of untested components. By replacing the disassembling of the test deck with the removal of a access door reduces the amount of non-testing test deck time, which optimizes the testing efficiency of a testing system where multiple different test decks are in various stages of pre-testing, testing, and post-testing. That is, the efficient engagement, removal, and replacement of an access door decreases the amount of time needed to prepare a test deck for data storage component testing. Additionally, the articulation of an access door, instead of disassembling top and bottom covers, reduces the risk of particulate generation and contamination in a data storage component enclosed testing region.

With a testing system configured with testing, loading, and exchange assemblies in accordance with the various embodiments, multiple test decks can be efficiently tested and individual data storage components can be modularly swapped without having to completely disassemble the test deck. The configuration and operation of the access port portion of a test deck allows an exchange assembly to efficiently access, remove, and replace a single data storage component. Configuring each test deck with a local controller allows test protocol to be independently conducted for each test deck that may involve cycling environmental parameters to determine the quality and performance of the individual data medium, slider assembly, HGA, and actuating assemblies of the test deck.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a bottom cover mating to a top cover to define an enclosed testing region, the top cover comprising an access port occupied by a door closing the access port via a magnetic latch, the enclosed testing region configured to house a data storage medium, transducing head, and head suspension.

2. The apparatus of claim 1, wherein the magnetic latch comprises a plurality of separated magnetic pads positioned on an access door.

3. The apparatus of claim 2, wherein the magnetic pads have a self-centering connection with a magnetic ring affixed to the top cover.

4. The apparatus of claim 1, wherein the bottom and top cover mate to surround enclosed testing region.

5. The apparatus of claim 1, wherein the bottom and top covers mate via one or more fasteners.

6. The apparatus of claim 1, wherein the top cover has one or more alignment pins extending into matching apertures in the bottom cover.

7. The apparatus of claim 1, wherein the bottom cover comprises a pivot stop feature protruding into the enclosed testing region.

8. The apparatus of claim 7, wherein the pivot stop positions the transducing head in alignment with the access port.

9. The apparatus of claim 1, wherein the bottom cover comprises a spindle aperture extending from a spindle assembly to outside the bottom cover, the spindle assembly configured to secure and rotate the data storage medium.

10. An apparatus comprising a bottom cover mating to a top cover to define an enclosed testing region, the top and bottom covers each comprising an access port occupied by a door and each disposed between first and second rails, the enclosed testing region housing a data storage medium, transducing head, and head suspension, the bottom cover comprising an electrical connection.

11. The apparatus of claim 10, wherein the enclosed testing region configured to house a single data storage medium, transducing head, and head suspension.

12. The apparatus of claim 10, wherein the access ports of the top and bottom covers are aligned along a first axis, the first axis being parallel to a second axis extending perpendicular to a data surface of the data storage medium.

13. The apparatus of claim 10, wherein the first rail comprises a first electrical connector.

14. The apparatus of claim 13, wherein the first electrical connector is positioned on a first surface of the first rail and a second electrical connector is positioned on a second surface of the first rail, the first and second surfaces parallel to media surfaces and facing opposite directions.

15. The apparatus of claim 13, wherein the first electrical connector is configured to electronically engage with a test slot.

16. The apparatus of claim 13, wherein a printed circuit board assembly (PCBA) is positioned on the top or bottom cover and is connected to the electrical connector.

17. The apparatus of claim 16, wherein the PCBA has an application specific integrated circuit (ASIC) directed to testing a data storage component housed in the enclosed testing region.

18. The apparatus of claim 13, wherein the enclosed testing region is filled with He at a subatmospheric pressure.

19. An apparatus comprising a bottom cover mating to a top cover to define an enclosed testing region, the top cover comprising an access port occupied by a door closing the access port via at least one flexible protrusion that extend beyond an areal extent of the door, the enclosed testing region configured to house a data storage medium, transducing head, and head suspension.

20. The apparatus of claim 19, wherein at least one gasket is positioned in a keyed protrusion of the door between the top cover and the door.

* * * * *